(No Model.)
M. BAIN.
TEA OR COFFEE POT, SAUCEPAN, &c.
No. 552,739. Patented Jan. 7, 1896.
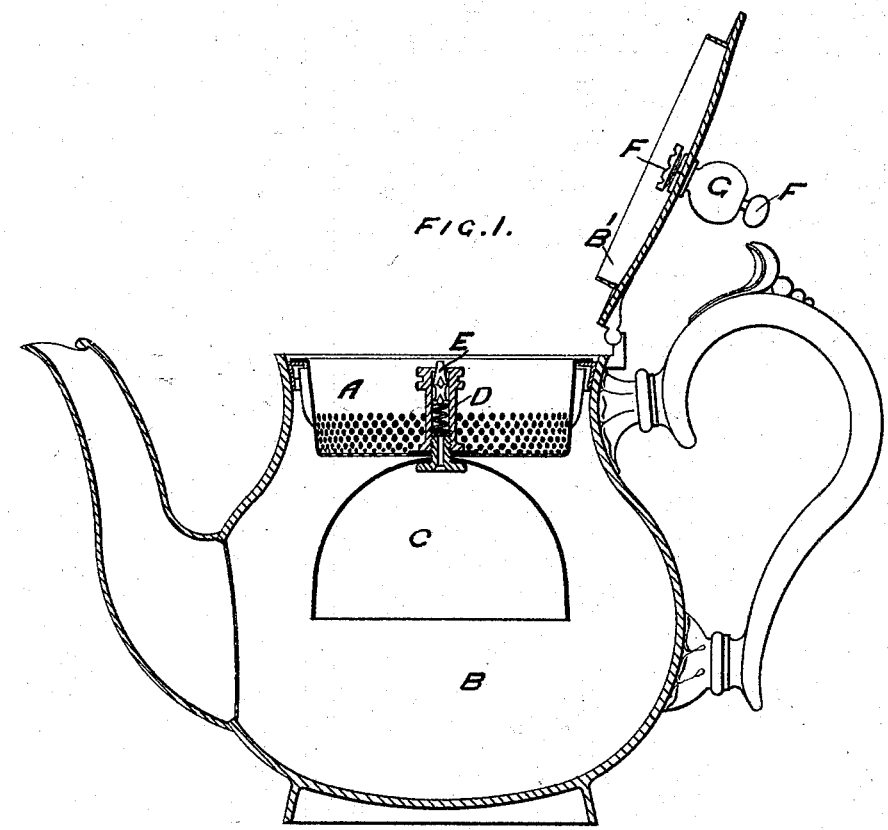
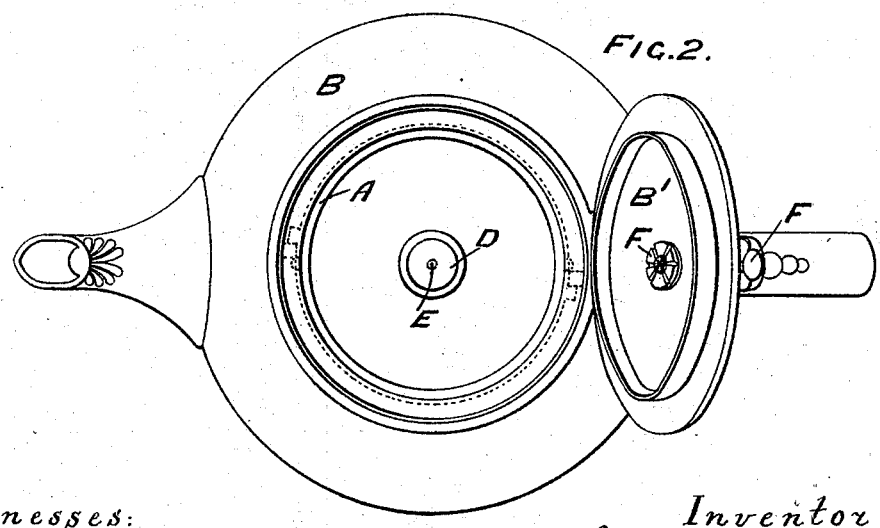
Witnesses:
J. C. Lebret.
O. Block.
Inventor:
Margaret Bain,
By H. A. de Vos.
Attorney.

UNITED STATES PATENT OFFICE.

MARGARET BAIN, OF GLASGOW, SCOTLAND.

TEA OR COFFEE POT, SAUCEPAN, &c.

SPECIFICATION forming part of Letters Patent No. 552,739, dated January 7, 1896.

Application filed September 14, 1895. Serial No. 562,547. (No model.) Patented in England May 10, 1895, No. 9,275.

*To all whom it may concern:*

Be it known that I, MARGARET BAIN, a citizen of the United Kingdom of Great Britain and Ireland, residing at 128 Byres Road, Dowanhill, in the city of Glasgow, Scotland, have invented new and useful Improvements in or applicable to Tea and Coffee Pots and to Saucepans and Like Cooking Utensils, (which have not been patented in any country except in Great Britain and Ireland by Letters Patent dated May 10, 1895, No. 9,275;) and I do hereby declare that the following is a full, clear, and exact description of the invention, which will enable others skilled in the art or manufacture to which it relates to make and use the same.

This invention relates to an improved straining device applicable to tea and coffee pots and urns of ordinary kinds, by means of which the infusion of tea or coffee made therein may be automatically separated from the spent leaves or grounds after the lapse of time necessary to effect the infusion, the device being also applicable to saucepans and like cooking utensils for boiling and steaming rice, potatoes, and other food-stuffs.

In the accompanying drawings, Figure 1 is a vertical section, and Fig. 2 a plan, of a teapot showing my invention applied thereto.

The improved device is composed of a strainer A, into which, as applied to a tea or coffee pot or urn, the dry tea or coffee is placed and which is suspended in the tea or coffee pot B directly under the lid B'. To the under side of the strainer A is attached a cylindrical, domed, or other shaped vessel C closed at its upper and open at its lower end, which latter dips into and may reach to within a short distance of the bottom of the tea or coffee pot. At the upper closed end of this vessel and passing through the strainer is a tube D, preferably fitted with a small valve E, by means of which communication may be established between the inside of the lower vessel and the atmosphere above the strainer.

In the operation of the apparatus the dry tea or coffee is placed in the strainer A and boiling water poured in and allowed to percolate through it into the pot B until the level of the leaves or grounds is reached, the latter being completely submerged, air being meanwhile confined in the lower vessel C, which serves as a displacer of part of the contents of the pot or urn. After the lapse of the interval necessary to complete the infusion of the tea or coffee the valve is opened, preferably by depressing a plunger F fitted in the central knob G on the lid, and the air confined in the vessel C being allowed to escape the infused liquor rises in the air vessel and the general level within the tea or coffee pot is correspondingly lowered so that it no longer remains in contact with the wet leaves or grounds on the strainer. The tea or coffee may then be poured in the usual way without disturbing the contents of the strainer.

In lieu of or in addition to providing a valve in the air-pipe, a minute orifice may be formed through which the air may escape during the process of infusion of the tea or coffee, in which case the level of the liquor in the pot is automatically lowered out of contact with the leaves independently of the operation of a valve; or, for the like purpose, the valve may conveniently be made of the screw-down type and so fitted that when partially screwed down the air may gradually escape, but when fully seated the air may be retained for any time within the air-vessel under the strainer.

The device when applied to a sauce-pan or similar cooking utensil is provided with a valve on the air-pipe which is kept closed to retain air within the air vessel or displacer during the operation of boiling such food-stuffs as rice or potatoes, which are placed in the strainer under the level of the water as raised by the displacer. When the boiling operation is completed the air-valve is opened to permit of the escape of the air and consequent lowering of the water-level under the strainer when further boiling of the water serves to steam the contents of the strainer.

Having now described the invention, what I desire to secure and claim by Letters Patent is—

1. In a cooking vessel, the combination of a strainer, a displacer located beneath the same, an air tube connected with said displacer, a valve in said air tube, and means extending to the exterior of said vessel and adapted to operate said valve to permit the discharge of air from said displacer, substantially as described.

2. In a cooking vessel, the combination of the strainer, a displacer beneath the same, an air tube connected with said displacer and extending upward therefrom, a spring actuated valve adapted to normally close the exit from said air tube, and means to operate said valve to permit the discharge of air from said displacer, substantially as described.

3. In a tea-pot or cooking utensil the combination of the strainer A, displacer C, air tube D provided with valve E and the plunger F in the pot lid for opening the valve substantially as described.

In witness whereof I have hereunto set my hand and seal this 19th day of July, 1895.

MARGARET BAIN. [L. S.]

Witnesses:
 WALLACE FAIRWEATHER,
 THOMAS THOMSON.